(12) United States Patent
Armstrong et al.

(10) Patent No.: US 12,447,875 B2
(45) Date of Patent: Oct. 21, 2025

(54) TOP TETHER DAMPER FOR CHILD CAR SEAT

(71) Applicant: Evenflo Company, Inc., Miamisburg, OH (US)

(72) Inventors: Oronde Armstrong, Charlotte, NC (US); Jay Bullington, Mount Holly, NC (US); Kurt Gabriel, Charlotte, NC (US); Phillip Przybylo, Waxhaw, NC (US)

(73) Assignee: Evenflo Company, Inc., Miamisburg, OH (US)

( * ) Notice: Subject to any disclaimer, the term of this patent is extended or adjusted under 35 U.S.C. 154(b) by 276 days.

(21) Appl. No.: 18/275,192

(22) PCT Filed: Jan. 28, 2022

(86) PCT No.: PCT/US2022/014343
§ 371 (c)(1),
(2) Date: Jul. 31, 2023

(87) PCT Pub. No.: WO2022/165199
PCT Pub. Date: Aug. 4, 2022

(65) Prior Publication Data
US 2024/0092234 A1  Mar. 21, 2024

Related U.S. Application Data

(60) Provisional application No. 63/143,350, filed on Jan. 29, 2021.

(51) Int. Cl.
B60N 2/28   (2006.01)
B60R 22/28  (2006.01)
(Continued)

(52) U.S. Cl.
CPC ......... *B60N 2/2818* (2023.08); *B60N 2/2812* (2013.01); *B60N 2/2821* (2013.01);
(Continued)

(58) Field of Classification Search
CPC .. B60N 2/2812; B60N 2/2818; B60N 2/2821; B60N 2/42; B60N 2/4221; B60N 2/4228;
(Continued)

(56) References Cited

U.S. PATENT DOCUMENTS 3,785,701 A   1/1974   Gilmore
8,087,725 B2  1/2012   Hutchinson et al.
(Continued)

OTHER PUBLICATIONS

International Preliminary Report on Patentability received for PCT Application No. PCT/US2022/014343, mailed on Aug. 10, 2023, 7 pages.
(Continued)

*Primary Examiner* — Syed A Islam
(74) *Attorney, Agent, or Firm* — SHOOK, HARDY & BACON L.L.P.

(57) ABSTRACT

Disclosed herein are car seats and bases therefor. The base includes top tether and an energy-absorbing elongate finger. The tether includes webbing. The webbing is at least partially wrapped about the elongate finger. The elongate finger is configured to deform when a load applied thereto by the webbing exceeds a predetermined threshold so as to pay out the webbing from the base.

20 Claims, 6 Drawing Sheets

(51) Int. Cl.
*B60R 22/34* (2006.01)
*B60R 22/46* (2006.01)

(52) U.S. Cl.
CPC ............. *B60R 22/28* (2013.01); *B60R 22/341* (2013.01); *B60R 22/4676* (2013.01)

(58) Field of Classification Search
CPC .. B60N 2/2884; B60N 2/2803; B60N 2/2806; B60N 2/2809; B60R 22/28; B60R 22/371; B60R 22/4676
See application file for complete search history.

(56) References Cited

U.S. PATENT DOCUMENTS

| | | | | |
|---|---|---|---|---|
| 8,593,293 | B2* | 11/2013 | Harrison | B60N 2/2816 180/273 |
| 8,688,421 | B2 | 4/2014 | Summers et al. | |
| 9,586,505 | B2* | 3/2017 | Morgenstern | B60N 2/2851 |
| 10,640,080 | B2* | 5/2020 | Choi | B60R 22/28 |
| 11,332,049 | B2* | 5/2022 | Frank | B60N 2/2812 |
| 11,427,114 | B2* | 8/2022 | Keegan | B60N 2/2875 |
| 2002/0043836 | A1* | 4/2002 | Maciejczyk | B60N 2/2869 297/250.1 |
| 2010/0109215 | A1* | 5/2010 | Ruthinowski | F16F 7/00 188/371 |
| 2016/0144752 | A1* | 5/2016 | Frank | B60N 2/42709 297/216.11 |
| 2021/0078460 | A1* | 3/2021 | Greenberg | B60R 22/26 |
| 2022/0055503 | A1* | 2/2022 | Peleska | B60N 2/2821 |
| 2024/0001822 | A1* | 1/2024 | Liu | B60N 2/2893 |

OTHER PUBLICATIONS

International Search Report issued in PCT/US2022/014343, issued Jan. 28, 2022, 15 pgs.

* cited by examiner

TOP TETHER DAMPER FOR CHILD CAR SEAT

FIELD OF THE INVENTION

The present disclosure relates generally to car seats for use in motor vehicles and bases for such car seats. More particularly, the present disclosure relates to car seats comprised of base, a top tether, and an elongate finger configured to deform when a load applied thereto by the top tether exceeds a predetermined threshold so as to pay out the webbing from the base.

BACKGROUND OF THE INVENTION

In the United States, child car seats are required by law and recommended for children of certain ages or sizes. There are many types of car seats available for purchase. Car seats recommended for children (rather than infants) are typically forward-facing. Such conventional car seats often include a seat that may latch into a base that is belted or tethered into the car. Conventionally, a top tether may be employed to attach an upper portion of the car seat to the car so as to prevent the car seat from rotating forward.

During a sudden slowing down or stopping of the car (e.g., during a front-end crash), a "pulling" force is generally exerted on the top tether. Conventional car seats may employ robust or otherwise non-extensible webbing for the top tether. Such a top tether is generally incapable of absorbing energy or reducing impact transmission to the occupant of the car seat. In this way, while certain conventional top tethers may generally prevent rotation of the car seat, such top tethers are still disadvantageous in terms of energy absorption, namely with respect to transmitting impact energy (i.e., the external impact) or absorbing the same so as to decrease a relative movement and/or acceleration of the car seat during such impact event.

It would be desirable to provide a car seat with such energy absorption means for protecting the occupant of the car seat from injury resulting from the external impact. It would further be desirable if such a car seat included seat shell, a base, and a tether belt path that does not interfere with rotation and/or reclination of the seat shell with respect to the base.

SUMMARY OF THE INVENTION

Disclosed herein are car seats and bases therefor. The car seats may be configured to be installed in an associated vehicle (e.g., in a forward-facing configuration, a rearward-facing configuration, a sideways or intermediate configuration, a booster configuration, and/or combinations thereof). The car seats may be installed in the vehicle using a tether, such as a top tether.

A base for a car seat of the present disclosure may include a tether and an energy-absorbing elongate finger. The tether may include webbing. At least part of the tether, such as a webbing, may at least partially wrap about the elongate finger. The elongate finger may be configured to deform. The elongate finger may be configured to deform when a load applied thereto by the tether exceeds a predetermined threshold. Deformation of the elongate finger under the load applied thereto by the tether may be so as to pay out the tether from the base.

The tether may be coupled at a first end thereof to an attachment point. The attachment point may be within the base. The tether may be coupled at a second end thereof to an anchoring point. The anchoring point may be an anchoring point of an associated vehicle within which the base is installed. In embodiments in which the tether includes a webbing, the tether may be a single length of webbing.

In particular constructions, the base may further comprise a bar. The tether may extend from the attachment point to the bar. The tether may change directions as the tether at least partially wraps about the bar. The tether may extend from the bar to the elongate finger. The tether may change directions again as the tether at least partially wraps about the elongate finger.

The elongate finger may, in embodiments, be coupled at a first end thereof to the base. The tether may be at least partially wrapped about a second end of the elongate finger. In certain embodiments, the second end of the elongate finger may be closer than the bar to the attachment point.

In embodiments, at least one of a length, a width, and a material of the elongate finger may be chosen so as to selectively tune the predetermined threshold. The elongate finger may be preloaded so as to selectively tune the predetermined threshold. In certain embodiments, the elongate finger may be preloaded by bending.

In certain constructions, the elongate finger may be coupled to a surface of the base. The elongate finger may be obliquely angled relative to the surface of the base. The elongate finger may be coupled to the base adjacent an upper portion of the base. The tether may wrap about the elongate finger and pass through a slot defined in the upper portion of the base.

In embodiments, the tether may be at least partially made of a generally robust, non-extensible material. The tether may, in certain embodiments, be a top tether.

Deformation of the elongate finger under the load applied thereto by the tether may cause the elongate finger to undergo a deformation.

In certain embodiments, a car seat of the present disclosure may comprise a base as previously described. The car seat may further comprise a seat shell.

In certain constructions, the seat shell may be configured to rotate and recline with respect to the base. The tether may define a tether path. The car seat may be constructed such that the seat shell does not interfere with the tether path as the seat shell is rotated or reclined with respect to the base. A tension of the tether, or at least part of the tether such as a webbing, may remain substantially constant as the seat shell is rotated or reclined with respect to the base. The seat shell may be detachable from the base. The car seat may be constructed such that detachment of the seat shell from the base does not interfere with the tether path. The car seat may be constructed such that detachment of the seat shell from the base does not substantially affect the tension of the tether.

In accordance with the foregoing, disclosed in exemplary embodiments herein are car seats and bases therefor. In accordance with particular embodiments of the present disclosure, an exemplary base for a car seat comprises: a tether; and an energy-absorbing elongate finger about which the tether is at least partially wrapped, the elongate finger configured to deform when a load applied thereto by the tether exceeds a predetermined threshold so as to pay out the tether from the base. In accordance with particular embodiments of the present disclosure, an exemplary car seat comprises a base as described above.

In accordance with other particular embodiments of the present disclosure, an exemplary car seat comprises: a seat shell; a base; a tether; and an energy-absorbing elongate finger coupled to the base and about which the tether is at least partially wrapped, the elongate finger configured to deform when a load applied by the tether exceeds a predetermined threshold so as to pay out the tether from the base.

In accordance with other particular embodiments of the present disclosure, an exemplary car seat comprises: a seat shell; a base; an energy-absorbing elongate finger coupled at a first end thereof to a surface of the base such that the elongate finger is obliquely angled relative to the surface of the base; a bar coupled to the base below the first end of the elongate finger; and a tether coupled at a first end thereof to an attachment point within the base, the tether extending (a) from the attachment point to the bar and being at least partially wrapped thereabout, (b) from the bar to the elongate finger and being at least partially wrapped about a second end of the elongate finger, and (c) from the second end of the elongate finger through a slot defined in an upper portion of the base; wherein the elongate finger is configured to deform when a load applied thereto by the tether exceeds a predetermined threshold so as to pay out the tether from the base through the slot.

In accordance with other particular embodiments of the present disclosure, an exemplary base for a car seat comprises: an energy-absorbing elongate finger coupled at a first end thereof to a surface of the base such that the elongate finger is obliquely angled relative to the surface of the base; and a tether contacting the elongate finger. The elongate finger may be configured to deform when a load applied thereto by the tether exceeds a predetermined threshold so as to pay out the tether from the base.

Other aspects of the invention may be apparent to those of ordinary skill with review of the attached drawings, appended claims, and additional description.

BRIEF DESCRIPTION OF THE DRAWING

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure is described with additional specificity and detail below through the use of the accompanying drawings.

DETAILED DESCRIPTION OF THE INVENTION

Figure 1:
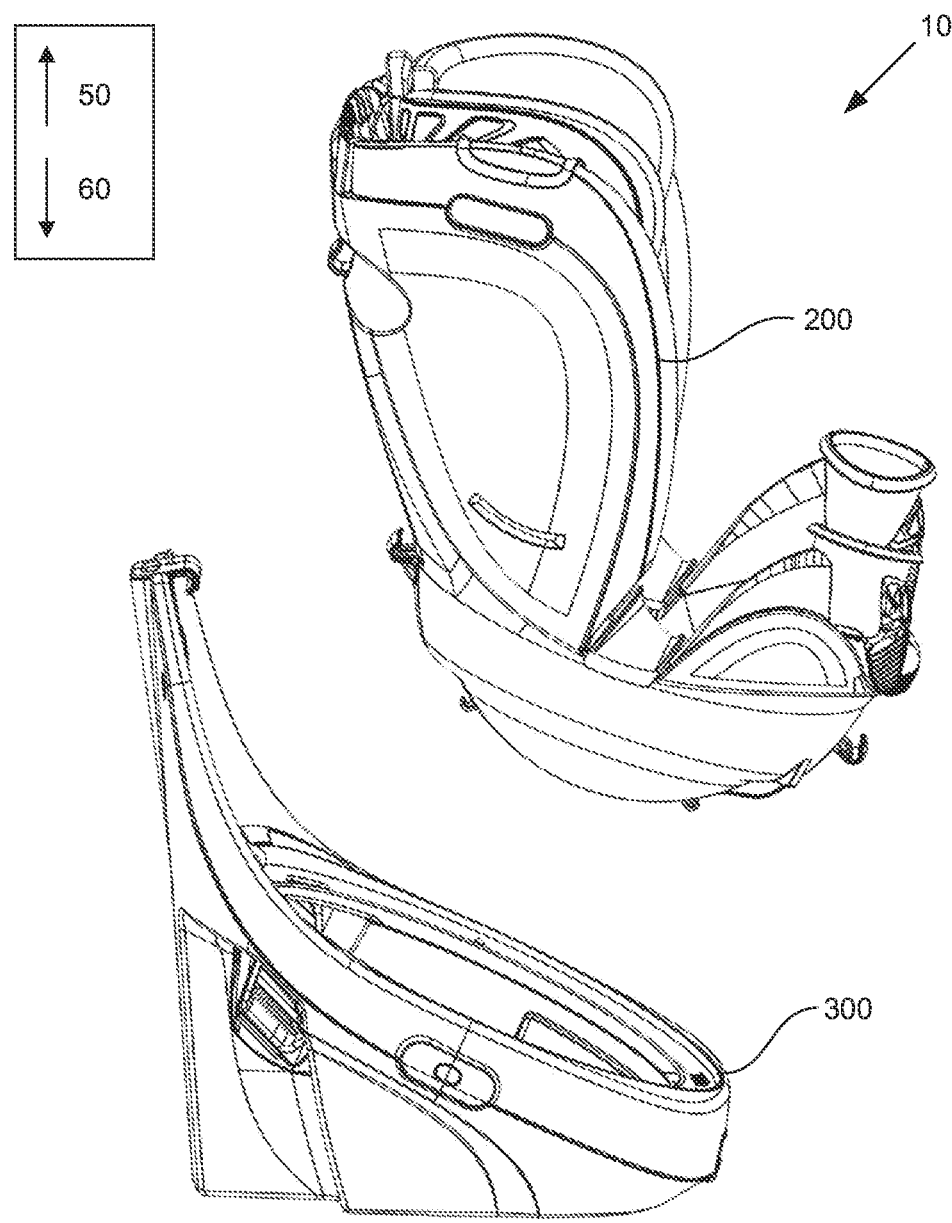
FIG. 1 is an exploded view of a car seat including a seat shell and a base in accordance with the present disclosure.

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" and the terms "forward" and "rearward" or are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" or "upwardly" and "downwards" or "downwardly" are also relative to an absolute reference; upwards is always against the gravity of the earth. The terms "forward" and "rearward" or "rear" with respect to a position or orientation are opposite one another along a common direction, and an "intermediate" position is always located between a forward position and a rearward position. The term "parallel" should be construed in its lay sense of two surfaces that maintain a generally constant distance between them, and not in the strict mathematical sense that such surfaces will never intersect when extended to infinity. The terms "operative to" and "adapted to" and similar terms are used herein to describe that a particular component has certain structural features designed to perform a designated function. Such components should be construed as having the expressed structure, with the designated function being considered part of the structure. The term "engage" and similar terms are used herein to describe the interaction between particular components and does not necessarily require that such components contact one another (directly or indirectly). As used herein and as will be appreciated by those skilled in the art, the term "car seat" encompasses car seats, safety seats, restraints, boosters, and the like for children, infants, and toddlers and the like.

In accordance with aspects of the disclosure, exemplary embodiments of car seats and bases therefor are illustrated in various levels of specificity in FIGS. 1-7. As will be appreciated by those skilled in the art, the car seats described herein may be convertible car seats that are convertible between a forward-facing configuration, a rearward-facing configuration, a sideways or intermediate configuration, a booster configuration, and/or combinations thereof. The car seats of the present disclosure may be configured to support an infant, child, toddler, or the like. Very generally, car seat 10 illustrated in FIG. 1 is designed for safely transporting an occupant in a car. As illustrated in FIG. 1, the car seat 10 generally includes a seat shell 200, which is supported on a base 300. As will be readily understood by those skilled in the art, the car seat 10 (and, namely, the base 300) may be affixed to the seat of a car, such as by tether (e.g., top tether) to prevent undesired forward rotation of the car seat 10.

The seat shell 200 may be removably attached to the base 300. Additionally, the seat shell 200 may be rotatable and/or reclinable with respect to the base 300. The seat shell 200 may be rotated to be selectively positionable in a variety of different positions (e.g., e.g., a rearward-facing position, a forward-facing position, an intermediate loading position). The seat shell 200 and base 300, including specifically the interface therebetween, is described in detail in copending U.S. patent application Ser. No. 16/993,365, entitled "Booster Seat to Base Attachment Mechanism," the disclosure of which is incorporated by reference herein.

Figure 2:
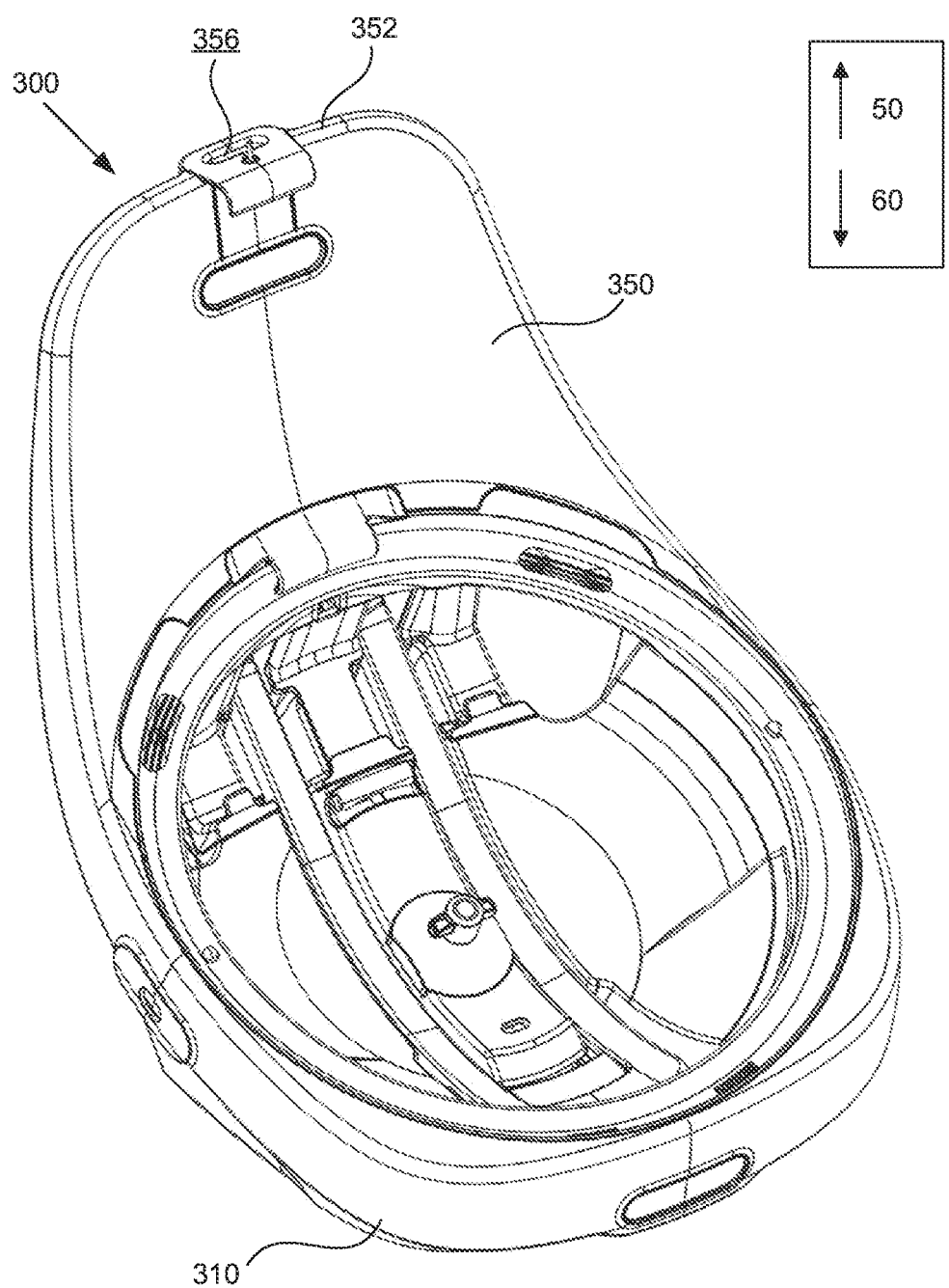
FIG. 2 is a front perspective view of the base of the car seat of FIG. 1.
Figure 3:
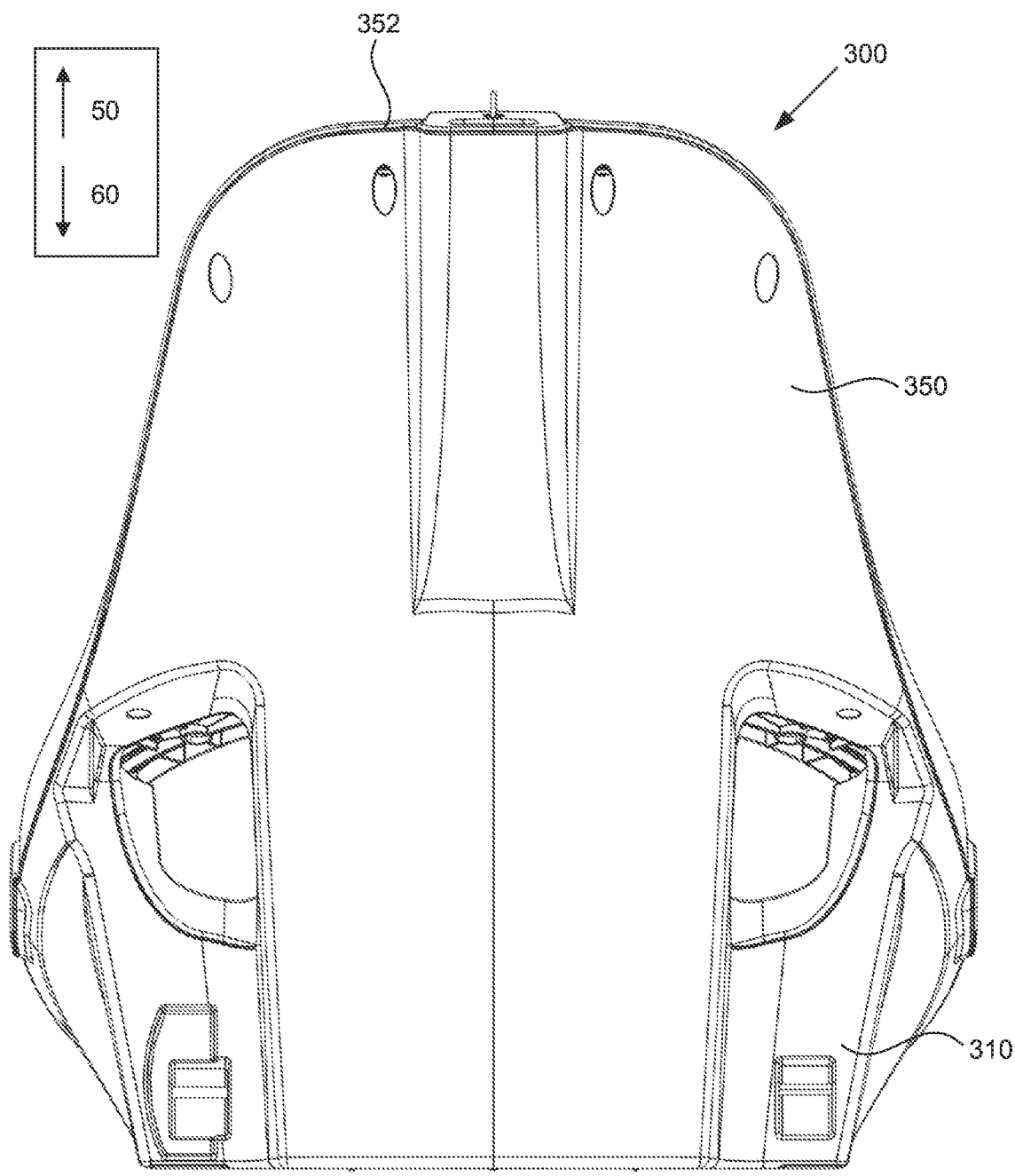
FIG. 3 is a rear view of the base of FIG. 2.
Figure 4:
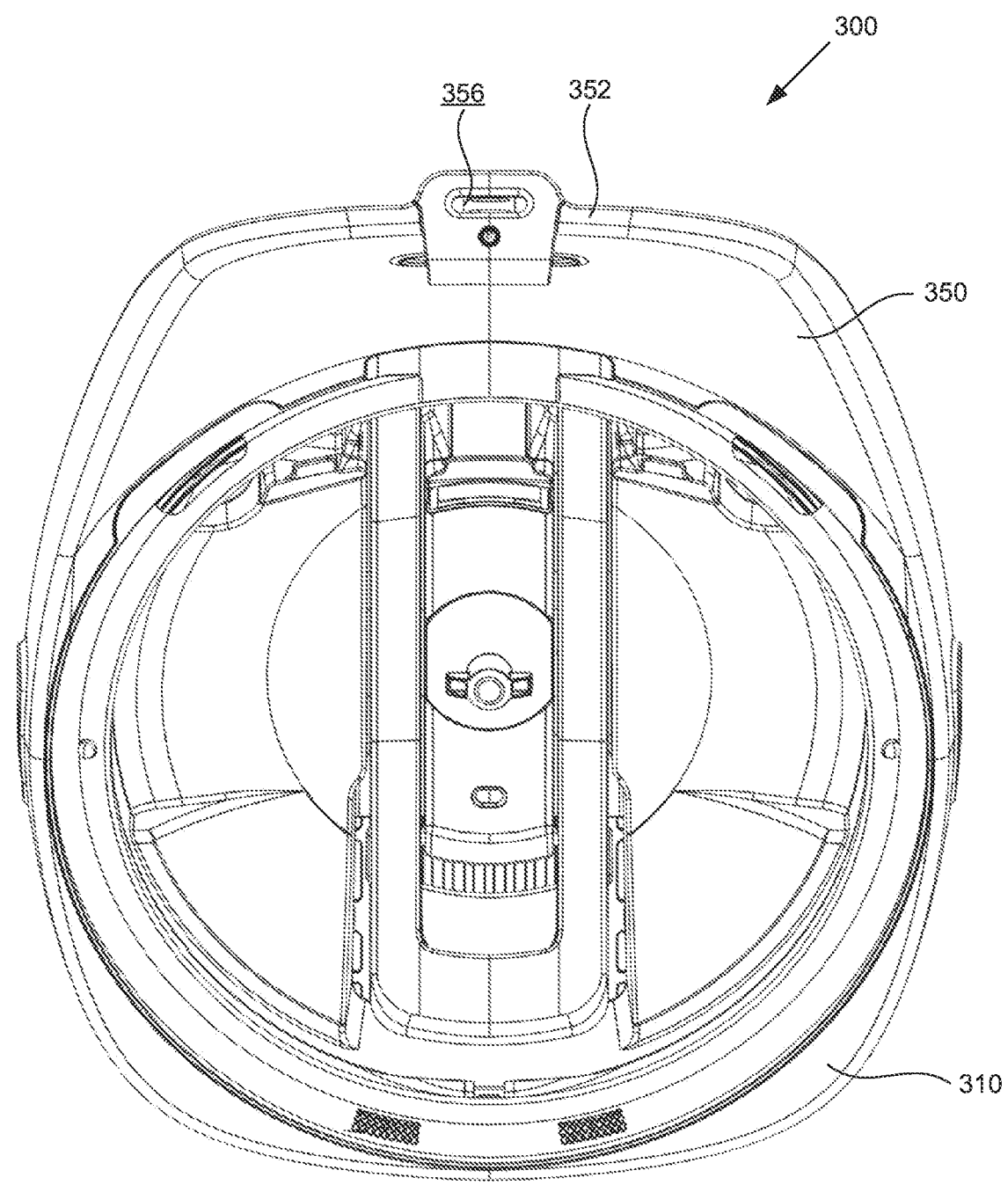
FIG. 4 is a top view of the base of FIG. 2.

FIGS. 2-4 illustrate various views of the base 300. Very generally, the base 300 may support and stabilize the seat shell 200. Generally, the base 300 may include a receiving portion 310 and a backing portion 350. The receiving portion 310 of the base 300 may generally operate to support the seat shell 200 for rotation and/or reclination with respect thereto. For example, at least a portion of the seat shell 200 may be received by and/or within the receiving portion 310 of the base 300. Put another way, the receiving portion 310 of the base 300 may be configured to interface with at least a portion of the seat shell 200. The backing portion 350 may extend upwardly away (i.e., in the direction of arrow 50) from the receiving portion 310.

As will be appreciated by those skilled in the art, the base 300 is configured to be installed in a vehicle using one or more tethers. By way of non-limiting example, the base 300 may be installed using a top tether designed to limit or prevent forward rotation of the base 300 during an impact event. With continued reference to FIGS. 2-4 and with further reference to FIG. 5, the base 300 may define one or more slots 356 therein. In embodiments, a slot 356 may be defined in the backing portion 350 of the base 300. The slot 356 may, in certain constructions, be defined in an upper portion of the base 300. By way of non-limiting example, the slot 356 may be defined in an upper end 352 of the base 300. The slot 356 may generally operate as an opening between the interior and the exterior of the base 300 for the passage of a tether 370 therethrough (refer to FIG. 5), as described in detail herein. As may now be appreciated, the slot 356 may be configured to remain stationary as the seat shell 200 is rotated and/or reclined with respect to the base 300. This advantageously allows the seat shell 200 to be rotated and/or reclined with respect to the base 300 without interfering with the slot 356 or tether passing therethrough and without any need to uninstall the base 300 or otherwise reroute or reposition the tether 370 passing through the slot 356 when it is desired to rotate and/or recline the seat shell 200 with respect to the base 300. In addition, the seat shell 200 is readily removable or detachable from the base 300 without any need to uninstall or reinstall the base 300 or otherwise reroute or reposition the tether 370 passing through the slot 356. As such, the car seat may advantageously remain constantly anchored via a top tether 370 passing through the slot 356 without interfering with rotation and/or reclination of the seat shell 200 with respect to the base 300.

Figure 5:
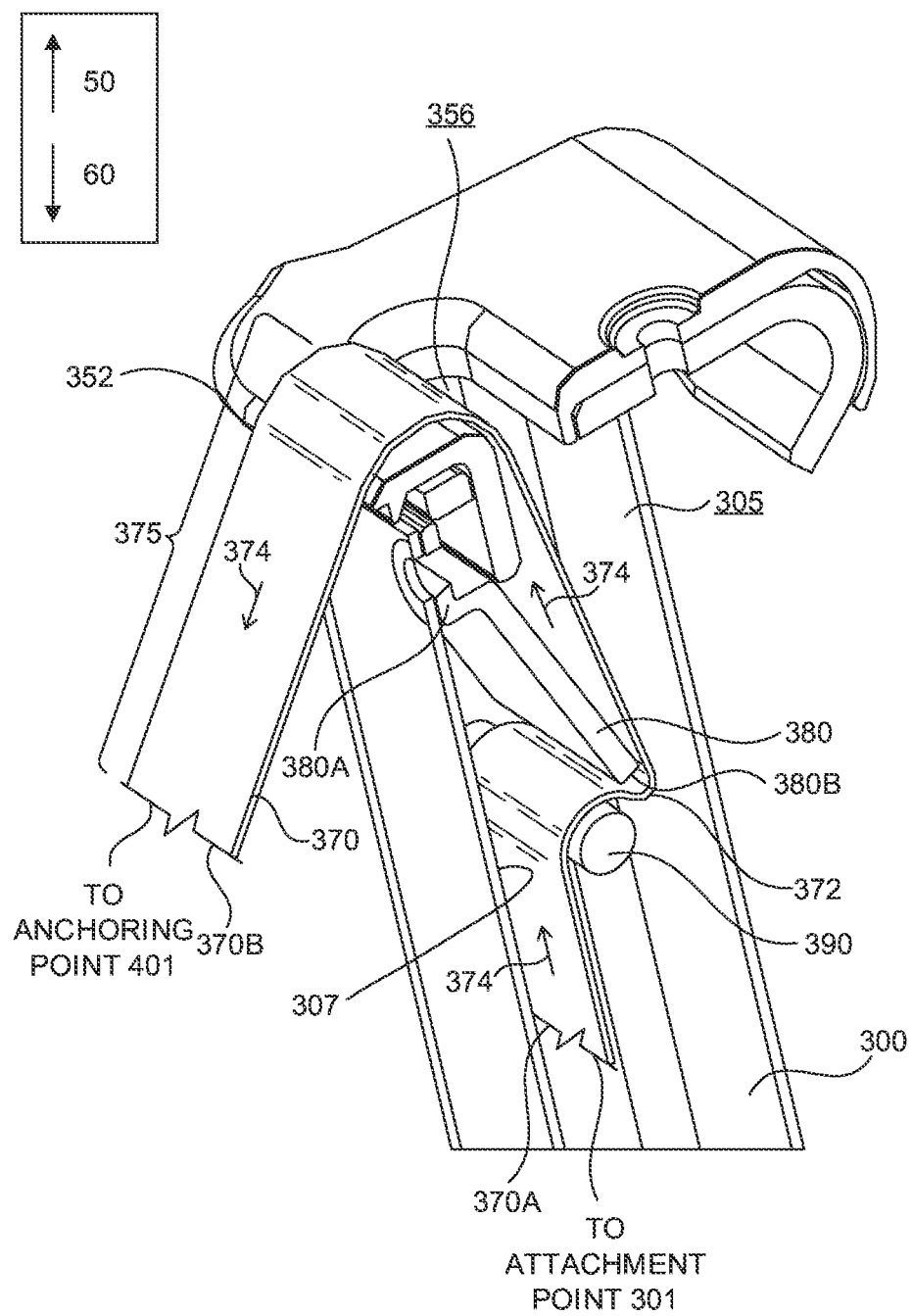
FIG. 5 is a cutaway perspective view of a portion of the upper portion of the base of FIG. 2 with an elongate finger in an extended configuration.

As may now be appreciated, the tether 370 (i.e., a top tether) may generally define a tether path 374, such as is illustrated in FIG. 5. The tether 370 generally includes a webbing 372. The webbing 372 may extend along the tether path 374 between a first end 370A and a second end 370B. The webbing 372 may be coupled at its first end to an attachment point 301. The attachment point 301 may generally be positioned within the base 300. The webbing 372 may be coupled at its second end (e.g., opposite the first end thereof) to an anchoring point 401. The anchoring point 401 may generally be positioned on the vehicle within which the base 300 is installed. As will be appreciated by those skilled in the art, the tether 370 may include structural components (e.g., hooks) configured to couple the webbing 372 to the attachment point 301 and the anchoring point 401. The tether 370 may be coupled to the base 300 and/or the vehicle within which the base 300 is installed by any suitable means, as will be readily appreciated by those skilled in the art.

Similarly to as previously described, the tether path 374 through the base 300 and, more particularly, from the base 300 to the anchoring point 401 of the vehicle, may be specifically designed such that the seat shell 200 is capable of being rotated and/or reclined with respect to the base 300 without interfering with the tether path 374 and without any need to uninstall the base 300 or otherwise reroute or reposition the tether path 374 when it is desired to rotate and/or recline the seat shell 200 with respect to the base 300. In addition, the seat shell 200 is readily removable or detachable from the base 300 without any need to uninstall or reinstall the base 300 or otherwise reroute or reposition the tether path 374. As an additional advantage, a tension of the webbing 372 will generally remain substantially constant as the seat shell 200 is rotated and/or reclined with respect to the base 300. As such, the seat shell 200 is readily rotatable and reclinable with respect to the base 300 and/or removable or detachable from the base 300 without any need to re-tension the webbing 372. Advantageously, this increases occupant safety and decreases the chances for user error.

The webbing 372 of the tether 370 may be any suitable webbing, as will be readily appreciated by those skilled in the art. By way of non-limiting example, the webbing 372 may be a single length of webbing, which may ease manufacture and may also ensure the structural integrity of the webbing 372. By way of further non-limiting example, the webbing 372 may be made of a generally robust, non-extensible material, such as the materials typically used for seat belt webbings. In other constructions, the webbing 372 may be made of an extensible material. In further constructions, the webbing 372 may be made of a combination of extensible and non-extensible materials. In embodiments, a portion of the webbing 372 extending solely within the base 300 (e.g., from the attachment point 301 to the slot 356) may be a different material or component from a portion of the webbing 372 extending solely outside the base 300 (e.g., from the slot 356 to the vehicle anchoring point 401).

With continued reference to FIG. 5, the slot 356 defined in the upper portion of the base 300 (e.g., in the upper end 352 of the base 300) may generally lead from the exterior of the base 300 to an interior 305 of the base 300. Within the interior 305 of the base 300, a bar 390 may be positioned. As may be understood with reference to FIG. 5, the bar 390 may be arranged so as to extend longitudinally along an axis substantially parallel to a surface of webbing 372 of the tether 370.

With continued reference to FIG. 5, the slot 356 defined in the upper portion of the base 300 (e.g., in the upper end 352 of the base 300) may generally provide an opening between the exterior of the base 300 to the interior 305 of the base 300. Within the interior 305 of the base 300, a bar 390 may be positioned. As may be understood with reference to FIG. 5, the bar 390 may be arranged so as to extend longitudinally along an axis substantially parallel to a surface of webbing 372 of the tether 370. As illustrated in FIG. 5, the webbing 372 may be at least partially wrapped about the bar 390. In certain embodiments, the webbing 372 may extend along the tether path 374 from the attachment point 301 to the bar 390 and change directions as the webbing 372 at least partially wraps about the bar 390. For example, in the embodiment illustrated in FIG. 5, the webbing 372 may extend generally upwardly (i.e., in the direction of arrow 50) from the attachment point 301 within the interior 305 of the base 300 and may then change directions so as to extend generally downwardly (i.e., in the direction of arrow 60) as the webbing 372 at least partially wraps about the bar 390.

Within the interior 305 of the base 300, an elongate finger 380 may be positioned. As described in detail herein, the elongate finger 380 may be an energy-absorbing elongate finger. As may be understood with reference to FIG. 5, the elongate finger 380 may be coupled to the base 300. In embodiments, the elongate finger 380 may be coupled to an upper portion of the base 300. By way of non-limiting example, the elongate finger 380 may be coupled to the base 300 adjacent the upper end 352 of the base 300 and/or proximate the slot 356 defined in the base 300. The elongate finger 380 may be coupled at a first end 380A thereof to the base 300. The elongate finger 380 may be coupled to a surface of the base. By way of non-limiting example, the elongate finger 380 may be coupled to a rear face 307 of the base 300 (e.g., within the interior 305 of the base 300). In certain constructions, the elongate finger 380 may be obliquely angled relative to the surface of the base 300 to which the elongate finger 380 is coupled, such as obliquely angled relative to the rear face 307 of the base 300.

As illustrated in FIG. 5, the webbing 372 may be at least partially wrapped about the elongate finger 380, such as being at least partially wrapped about the second end 380B of the elongate finger 380. In certain embodiments, as partially described above, the webbing 372 may extend along the tether path 374 from the bar 390 to the elongate finger 380 and change directions as the webbing 372 at least partially wraps about the elongate finger 380. For example, in the embodiment illustrated in FIG. 5, the webbing 372 may extend generally downwardly (i.e., in the direction of arrow 60) from the bar 390 and may then change directions so as to extend generally upwardly (i.e., in the direction of arrow 50) as the webbing 372 at least partially wraps about the elongate finger 380 (e.g., the second end 380B thereof). The webbing 372 may then generally extend from the second end 380B of the elongate finger 380 generally upwardly (i.e., in the direction of arrow 50), such as toward the upper end 352 of the base 300, and may pass through the slot 356 defined in the base 300.

In certain constructions, the bar 390 may be coupled to the base 300 at a location below a location at which the elongate finger 380 is coupled to the base 300. For example, as illustrated in FIG. 5, the elongate finger 380 may be coupled to the base 300 at the first end 380A of the elongate finger 380, and the bar 390 may be coupled to the base 300 below the first end 380A of the elongate finger 380. In particular embodiments, the elongate finger 380 may extend from the wall of the base 300 to the bar 390. In some embodiments, the elongate finger 380 ends at or above the bar 390. For example, as illustrated in FIG. 5, the bar 390 may be closer than the second end 380B of the elongate finger 380 to the attachment point 301 within the base 300. Put another way, a distance between the attachment point 301 and the second end 380B of the elongate finger 380 may be greater than a distance between the attachment point 301 and the bar 390. In some embodiments, a distance between the attachment point 301 and the second end 380B of the elongate finger 380 is the same as a distance between the attachment point 301 and the bar 390. In other embodiments, the elongate finger 380 may extend below the bar 390. For example, the second end 380B of the elongate finger 380 may be closer than the bar 390 to the attachment point 301 within the base 300.

The elongate finger 380 is generally configured to operate as an energy-absorbing element. In particular, the elongate finger 380 is configured to deform when a load applied to the elongate finger 380 by the webbing 372 exceeds a predetermined threshold. For example, longitudinal "pulling" forces exerted on the webbing 372 may, in turn, be transferred to the elongate finger 380, and, as the load transferred by the webbing 372 to the elongate finger 380 exceeds a predetermined threshold, the elongate finger 380 may be configured to automatically deform. Deformation of the elongate finger 380 may allow paying out of the webbing 372 from the base 300 (e.g., through the slot 356), such as by effectively making available an additional usable length of the webbing 372. Deformation of the elongate finger 380 may provide means through which the elongate finger 380 is configured to absorb energy and/or reduce impact transmission to reduce the forces acting on an occupant of the car seat.

As described herein, the elongate finger 380 is generally configured to undergo deformation under the load applied by the webbing 372. By way of non-limiting example, the elongate finger 380 may undergo deformation in the form of buckling, bending, crushing, shearing, twisting, other deformation, and/or combinations thereof.

Figure 6:
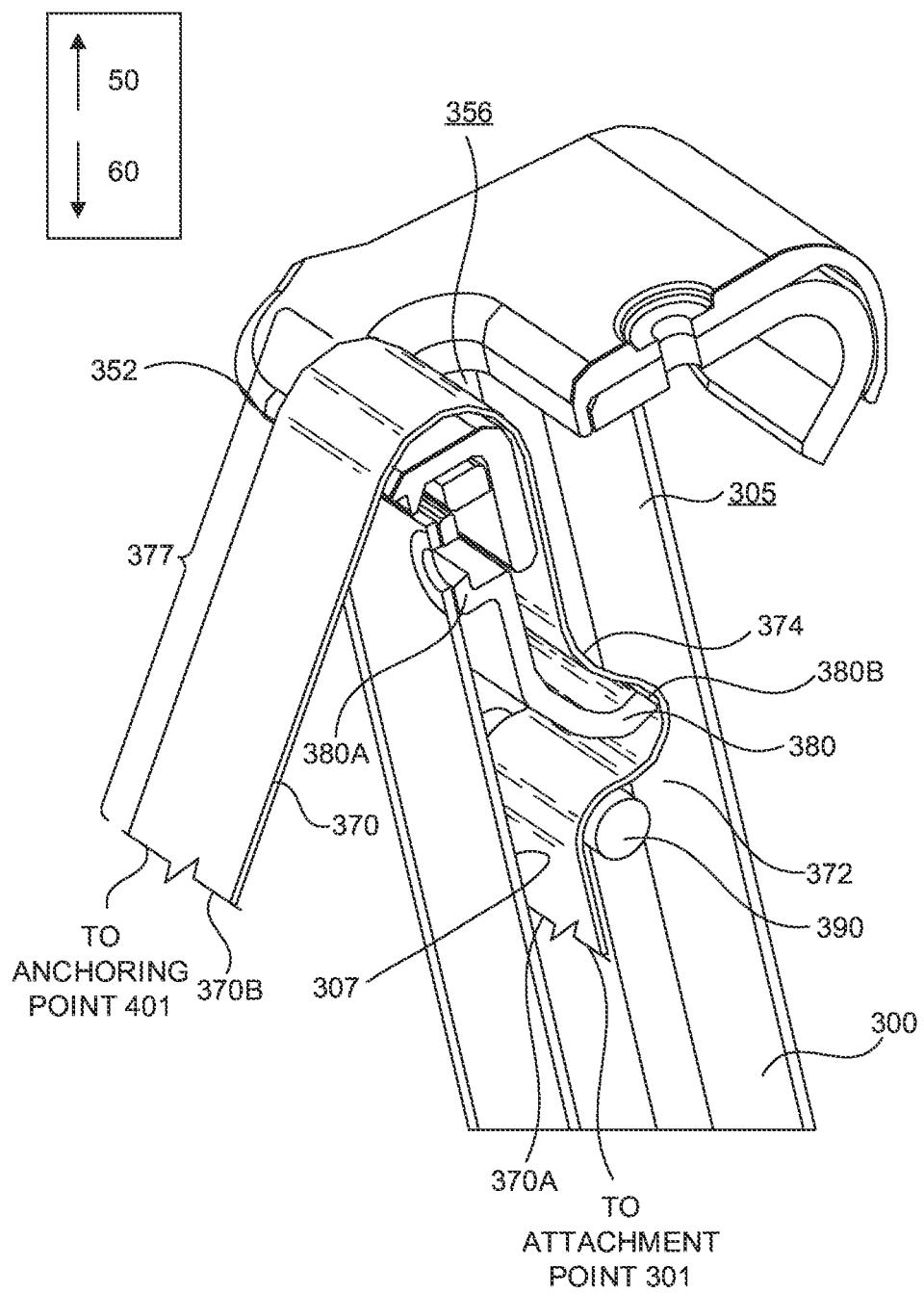
FIG. 6 is another cutaway perspective view of a portion of the upper portion of the base with the elongate finger of FIG. 5 in a deformed configuration.

In certain constructions, under the load applied to the elongate finger 380 by the webbing 372, the elongate finger 380 may be caused to undergo a defined deformation, such as one of the forms of deformation described above. FIG. 5 depicts the elongate finger 380 is an extended, non-deformed state, such as when the elongate finger is under no load or under a load that does not exceed the predetermined threshold for deformation. In this state, the webbing 372 includes a first length 375 outside of the slot 356 of the base 300. FIG. 6 depicts the elongate finger 380 is a deformed state. In this example in FIG. 6, the elongate finger 380 has bent such that the second end 380B of the elongate finger 380 is farther from the attachment point 301 and closer to the slot 356 compared to the position of the second end 380B in FIG. 5. As a result, the webbing 372 now includes a second length 377 outside of the slot 356 of the base 300, that is longer than the first length 375 in FIG. 5. It should be appreciated that the first length 375 and the second length 377 are merely representative of the portion of the webbing 372 that extends outside of the base 300, a portion of which is removed in FIGS. 5 and 6 for ease of viewing. It further be appreciated that the elongate finger 380 may take on other configurations in a deformed state. For example, the elongate finger 380 may deform in another direction than shown in FIG. 6. It should be understood that the resulting change in the pay out of the webbing 372 may also vary.

The deformation of the elongate finger 380 may be selectively tuned based upon the material properties or dimensions of the elongate finger 380. By way of non-limiting example, a material, a length, a width, and/or other properties or dimensions of the elongate finger 380 may be chosen so as to selectively tune the predetermined load threshold that, once exceeded, causes the deformation of the elongate finger 380. In certain embodiments, the elongate finger 380 may be preloaded (e.g., by bending) so as to selectively tune the predetermined load threshold that, once exceeded, causes the deformation of the elongate finger 380. In this way, release of the webbing 372 may be selectively tuned so as to change the dynamics of the base and car seat to reduce injury to an occupant of the car seat.

In addition to or alternatively to the foregoing, the energy absorption effects described above could be achieved by placing the elongate finger 380 described above and/or another deformable or crushable member in the load path of the webbing 372. By way of non-limiting example, other contemplated embodiments include a compressible material (e.g., honeycomb, foam) or a pin about which the webbing 372 is at least partially wrapped and that is configured to deform and/or shear resulting in a fuse-like effect for energy absorption similarly to as described above.

While particular exemplary embodiments have been described, it is not intended that the claims be limited thereto, as it is intended that the claims be as broad in scope as the art will allow and that the specification be read likewise. That is, the foregoing description of specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It will be appreciated by those of ordinary skill in the art that the components, method steps and materials illustrated above may be varied by substitution of equivalent components, steps and materials capable of performing the same functions. It will also be appreciated by one of ordinary skill in the art that sizes and strengths of the components may be scaled up or down as required for specific purposes. The claims hereof are intended to encompass all such equivalent components, method steps and scales.

What is claimed is:

1. A base for a car seat, the base comprising: a tether; and an energy-absorbing elongate finger about which the tether is at least partially wrapped, the elongate finger configured to deform when a load applied thereto by the tether exceeds a predetermined threshold so as to pay out the tether from the base.

2. The base of claim 1, wherein the tether includes a first end that is coupled to an attachment point within the base.

3. The base of claim 2, wherein the tether has a second end that is coupled to an anchoring point of an associated vehicle within which the base is installed.

4. The base of claim 3, wherein the tether is a single length of a webbing.

5. The base of claim 2, further comprising a bar, wherein the tether extends from the attachment point, changes directions as the tether at least partially wraps about the bar, and changes directions again as the tether at least partially wraps about the elongate finger.

6. The base of claim 5, wherein the elongate finger has a first end and a second end, the first end of the elongate finger is coupled to the base and the tether is at least partially wrapped about the second end of the elongate finger.

7. The base of claim 1, wherein at least one of a length, a width, and a material of the elongate finger is chosen so as to selectively tune the predetermined threshold.

8. The base of claim 1, wherein the elongate finger is preloaded so as to selectively tune the predetermined threshold.

9. The base of claim 8, wherein the elongate finger is preloaded by bending.

10. The base of claim 1, wherein the elongate finger is coupled to a surface of the base and is obliquely angled relative to the surface of the base.

11. The base of claim 1, wherein the elongate finger is coupled to the base adjacent an upper portion of the base, the tether wrapping about the elongate finger and passing through a slot defined in the upper portion of the base.

12. The base of claim 1, wherein the tether comprises a webbing made of a generally robust, non-extensible material.

13. The base of claim 1, wherein the tether is a top tether.

14. The base of claim 1, wherein deformation of the elongate finger under the load applied thereto by the tether causes the elongate finger to undergo a deformation.

15. A car seat comprising the base of claim 1.

16. A car seat, comprising: a seat shell; a base; a tether; and an energy-absorbing elongate finger coupled to the base and about which the tether is at least partially wrapped, the elongate finger configured to deform when a load applied by the tether exceeds a predetermined threshold so as to pay out the tether from the base.

17. The car seat of claim 16, wherein the seat shell is configured to rotate and recline with respect to the base, the tether defines a tether path, and the seat shell does not interfere with the tether path as the seat shell is rotated or reclined with respect to the base.

18. The car seat of claim 17, wherein the seat shell is configured to rotate and recline with respect to the base and a tension of the tether remains substantially constant as the seat shell is rotated or reclined with respect to the base.

19. The car seat of claim 18, wherein the seat shell is detachable from the base and detachment of the seat shell from the base does not interfere with the tether path or substantially affect the tension of the tether.

20. A base for a car seat, the base comprising: an energy-absorbing elongate finger coupled at a first end thereof to a surface of the base such that the elongate finger is obliquely angled relative to the surface of the base; and a tether contacting the elongate finger, wherein the elongate finger is configured to deform when a load applied thereto by the tether exceeds a predetermined threshold so as to pay out the tether from the base.

* * * * *